(12) United States Patent
Huang et al.

(10) Patent No.: US 11,029,721 B2
(45) Date of Patent: Jun. 8, 2021

(54) ELECTRONIC DEVICE CAPABLE OF ADJUSTING LIGHT EMITTING FREQUENCY, COMPUTER SYSTEM HAVING THE SAME AND METHOD FOR ADJUSTING LIGHT EMITTING FREQUENCY OF ELECTRONIC DEVICE

(71) Applicant: GIGA-BYTE TECHNOLOGY CO., LTD., New Taipei (TW)

(72) Inventors: Shun-Chih Huang, New Taipei (TW); Yen-Lin Li, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 116 days.

(21) Appl. No.: 16/221,604

(22) Filed: Dec. 17, 2018

(65) Prior Publication Data
US 2019/0196530 A1 Jun. 27, 2019

(30) Foreign Application Priority Data
Dec. 25, 2017 (TW) ................................ 10614559.2

(51) Int. Cl.
*G06F 1/08* (2006.01)
*G06F 1/12* (2006.01)
*H05B 47/16* (2020.01)
*H05B 47/155* (2020.01)

(52) U.S. Cl.
CPC .................. *G06F 1/08* (2013.01); *G06F 1/12* (2013.01); *H05B 47/155* (2020.01); *H05B 47/16* (2020.01)

(58) Field of Classification Search
None
See application file for complete search history.

(56) References Cited

U.S. PATENT DOCUMENTS

| 4,024,491 | A | 5/1977 | Pellerin et al. | |
|---|---|---|---|---|
| 8,587,384 | B2 * | 11/2013 | Satoh | H03L 1/025 331/117 R |
| 2009/0051444 | A1 * | 2/2009 | Inoue | H03L 1/02 331/57 |
| 2015/0318858 | A1 * | 11/2015 | Yang | H03L 7/1974 327/156 |

OTHER PUBLICATIONS

Search Report issued in corresponding European patent application dated May 17, 2019.

* cited by examiner

*Primary Examiner* — Fahmida Rahman
(74) *Attorney, Agent, or Firm* — Idea Intellectual Limited; Margaret A. Burke; Sam T. Yip

(57) ABSTRACT

An electronic device capable of adjusting light emitting frequency includes an oscillator used to generate an oscillation signal, a microcontroller connected to the oscillator, and a light emitting module connected to the microcontroller. The microcontroller is used to define that an oscillation times of the oscillator within a unit time period is an original oscillation times. The microcontroller sets a correspondence between a switching period and the original oscillation times. The microcontroller is further used to receive the oscillation signal to calculate a time elapse. The microcontroller is configured to control on or off of the light emitting module according to the switching period and the time elapse.

6 Claims, 5 Drawing Sheets

ELECTRONIC DEVICE CAPABLE OF ADJUSTING LIGHT EMITTING FREQUENCY, COMPUTER SYSTEM HAVING THE SAME AND METHOD FOR ADJUSTING LIGHT EMITTING FREQUENCY OF ELECTRONIC DEVICE

CROSS-REFERENCE TO RELATED APPLICATION

This non-provisional application claims priority under 35 U.S.C. § 119(a) to Patent Application No. 106145592 filed in Taiwan, R.O.C. on Dec. 25, 2017, the entire contents of which are hereby incorporated by reference.

FIELD OF INVENTION

The instant disclosure relates to an electronic device having a light emitting module, and in particular to an electronic device capable of adjusting light emitting frequency, a computer system having the same, and a method for adjusting light emitting frequency.

BACKGROUND

An electronic device known to the inventor for which a light emitting element is configured, such as a keyboard, a mouse, or a housing includes an oscillator and a microcontroller. FIG. 8 is a schematic diagram of a clock signal of the electronic device known to the inventor for which a light emitting element is configured. The microcontroller controls the light emitting frequency of the light emitting element by using the clock signal defined by the oscillator as a time reference. Specifically, the clock signal is defined according to a quantity n of oscillation times (for example, a million times) of a crystal of the oscillator within a unit time period t (for example, 1 ms). Therefore, the light emitting element may flicker or have color changed when a product is operated, and provide a user with a varied vision feeling.

However, because the oscillation frequency of the crystal is affected by the temperature and changes, the quantity n of oscillation times within the unit time period t is different from a theoretical value, and then the light emitting frequency of the light emitting element of the electronic product is changed. That is, when the quantity of oscillation times of the crystal is n, an actual consumption time may be longer than or shorter than the unit time period t, and an error time Δt is generated, as shown in FIG. 8. Therefore, even if light emitting elements with which several computer peripherals are equipped have a same flickering or color-changing frequency from the start, as quantities of oscillation times of crystals of oscillators change, the light emitting elements gradually cannot synchronously flicker or have color changed.

SUMMARY OF INVENTION

In view of this, the instant disclosure proposes an electronic device capable of adjusting light emitting frequency, a computer system having the same, and a method for adjusting light emitting frequency of an electronic device.

One or some embodiments of the instant disclosure provide an electronic device capable of adjusting light emitting frequency. The electronic device includes an oscillator, a microcontroller, and a light emitting module. The oscillator is used to generate an oscillation signal. The microcontroller is connected to the oscillator, where the microcontroller is used to define that a quantity of oscillation times of the oscillator within a unit time period is an original quantity of oscillation times, and set a correspondence between a switching period and the original quantity of oscillation times, and the microcontroller is further used to receive the oscillation signal to calculate a time elapse. The light emitting module is connected to the microcontroller, and the microcontroller is configured to control on or off of the light emitting module according to the switching period and the time elapse. The microcontroller further includes a counting module and an adjustment module. The counting module is used to count, after receiving a correction trigger signal, a total quantity of oscillation times of the oscillator according to the oscillation signal. The adjustment module is used to obtain a corrected quantity of oscillation times within the unit time period according to the total quantity of oscillation times counted within a sampling time period, and used to reset a correspondence between the switching period and the corrected quantity of oscillation times. Therefore, microcontrollers of electronic devices may control on or off of light emitting modules according to a switching period and a time elapse that are reset, so that light emitting frequencies of the light emitting modules are synchronized.

In one or some embodiments of the instant disclosure, the correction trigger signal includes a correction start signal at the beginning of the sampling time period and a correction end signal at the end of the sampling time period. The counting module begins counting after receiving the correction start signal, and stops counting after receiving the correction end signal.

In one or some embodiments of the instant disclosure, the correction trigger signal is a continuous signal within the sampling time period, and the counting module counts the total quantity of oscillation times of the oscillator when the correction trigger signal exists.

In one or some embodiments of the instant disclosure, the microcontroller is used to zero, after receiving a zeroing trigger signal, the time elapse.

In one or some embodiments of the instant disclosure, the adjustment module is further used to compare the corrected quantity of oscillation times with the original quantity of oscillation times, and reset the correspondence between the switching period and the corrected quantity of oscillation times when the corrected quantity of oscillation times is not equal to the original quantity of oscillation times.

One or some embodiments of the instant disclosure further provide a method for adjusting light emitting frequency of an electronic device. The method includes: generating, by an oscillator, an oscillation signal, and defining that a quantity of oscillation times of the oscillation signal within a unit time period is an original quantity of oscillation times; setting, by a microcontroller, a correspondence between a switching period and the original quantity of oscillation times, and controlling on or off of a light emitting module according to the switching period and a time elapse; receiving, by a counting module of the microcontroller, a correction trigger signal, and counting a total quantity of oscillation times of the oscillator within a sampling time period; obtaining, by an adjustment module of the microcontroller, a corrected quantity of oscillation times within the unit time period according to the total quantity of oscillation times counted within the sampling time period, and resetting a correspondence between the switching period and the corrected quantity of oscillation times; and controlling on or off of the light emitting module according to the switching period and the time elapse that are reset.

In one or some embodiments of the instant disclosure, in the step of receiving a correction trigger signal, the correction trigger signal includes a correction start signal at the beginning of the sampling time period and a correction end signal at the end of the sampling time period, and the step further includes: starting counting after receiving the correction start signal, and stopping counting after receiving the correction end signal.

In one or some embodiments of the instant disclosure, the correction trigger signal is a continuous signal within the sampling time period, and the step further includes counting the total quantity of oscillation times of the oscillator when the correction trigger signal exists.

In one or some embodiments of the instant disclosure, the method further includes a step of zeroing, after receiving a zeroing trigger signal, the time elapse.

In one or some embodiments of the instant disclosure, after the obtaining a corrected quantity of oscillation times, the method further includes: comparing the corrected quantity of oscillation times with the original quantity of oscillation times, and resetting the correspondence between the switching period and the corrected quantity of oscillation times when the corrected quantity of oscillation times is not equal to the original quantity of oscillation times.

One or some embodiments of the instant disclosure furthermore provide a computer system, including: a main board and an electronic device. The main board includes at least: a central processing unit, a system chip set, and a first connection port connected to the central processing unit through the system chip set, where the central processing unit sends a correction trigger signal through the first connection port, and the electronic device is connected to the first connection port of the main board. The electronic device includes an oscillator, a microcontroller, and a light emitting module. The oscillator generates an oscillation signal. The microcontroller is connected to the oscillator and the processor, the microcontroller defines that a quantity of oscillation times of the oscillator within a unit time period is an original quantity of oscillation times, and receives the oscillation signal to calculate a time elapse, and the microcontroller sets a correspondence between a switching period and the original quantity of oscillation times. The light emitting module is connected to the microcontroller. The microcontroller controls on or off of the light emitting module according to the switching period and the time elapse. The microcontroller further includes a counting module and an adjustment module. The counting module is used to count, after receiving the correction trigger signal, a total quantity of oscillation times of the oscillator according to the oscillation signal. The adjustment module is used to obtain a corrected quantity of oscillation times within the unit time period according to the total quantity of oscillation times counted within a sampling time period, and reset a correspondence between the switching period and the corrected quantity of oscillation times.

In one or some embodiments of the instant disclosure, the central processing unit obtains a service temperature value of the electronic device, and sends the correction trigger signal when the service temperature value is greater than a threshold.

In one or some embodiments of the instant disclosure, the correction trigger signal includes a correction start signal at the beginning of the sampling time period and a correction end signal at the end of the sampling time period. The counting module starts counting after receiving the correction start signal, and stops counting after receiving the correction end signal.

In one or some embodiments of the instant disclosure, the correction trigger signal is a continuous signal within the sampling time period, and the counting module counts the total quantity of oscillation times of the oscillator when the correction trigger signal exists.

In one or some embodiments of the instant disclosure, the central processing unit sends a zeroing trigger signal through the first connection port, and after receiving the zeroing trigger signal, the microcontroller zeros the time elapse.

In one or some embodiments of the instant disclosure, the adjustment module is further used to compare the corrected quantity of oscillation times with the original quantity of oscillation times, and reset the correspondence between the switching period and the corrected quantity of oscillation times when the corrected quantity of oscillation times is not equal to the original quantity of oscillation times.

Through the electronic device capable of adjusting light emitting frequency, the computer system, and the method described in one or some embodiments disclosed above, the microcontroller of the electronic device may perform procedures of counting a quantity of oscillation times and adjusting a switching period. Therefore, the microcontroller of the electronic device may control on or off of the light emitting module according to a switching period and a time elapse that are reset, so that light emitting frequencies of light emitting modules of a plurality of electronic devices are synchronized.

BRIEF DESCRIPTION OF THE DRAWINGS

The instant disclosure will become more fully understood from the detailed description given herein below for illustration only, and thus are not limitative of the instant disclosure, and wherein.

DETAILED DESCRIPTION OF THE INVENTION

Figure 1:
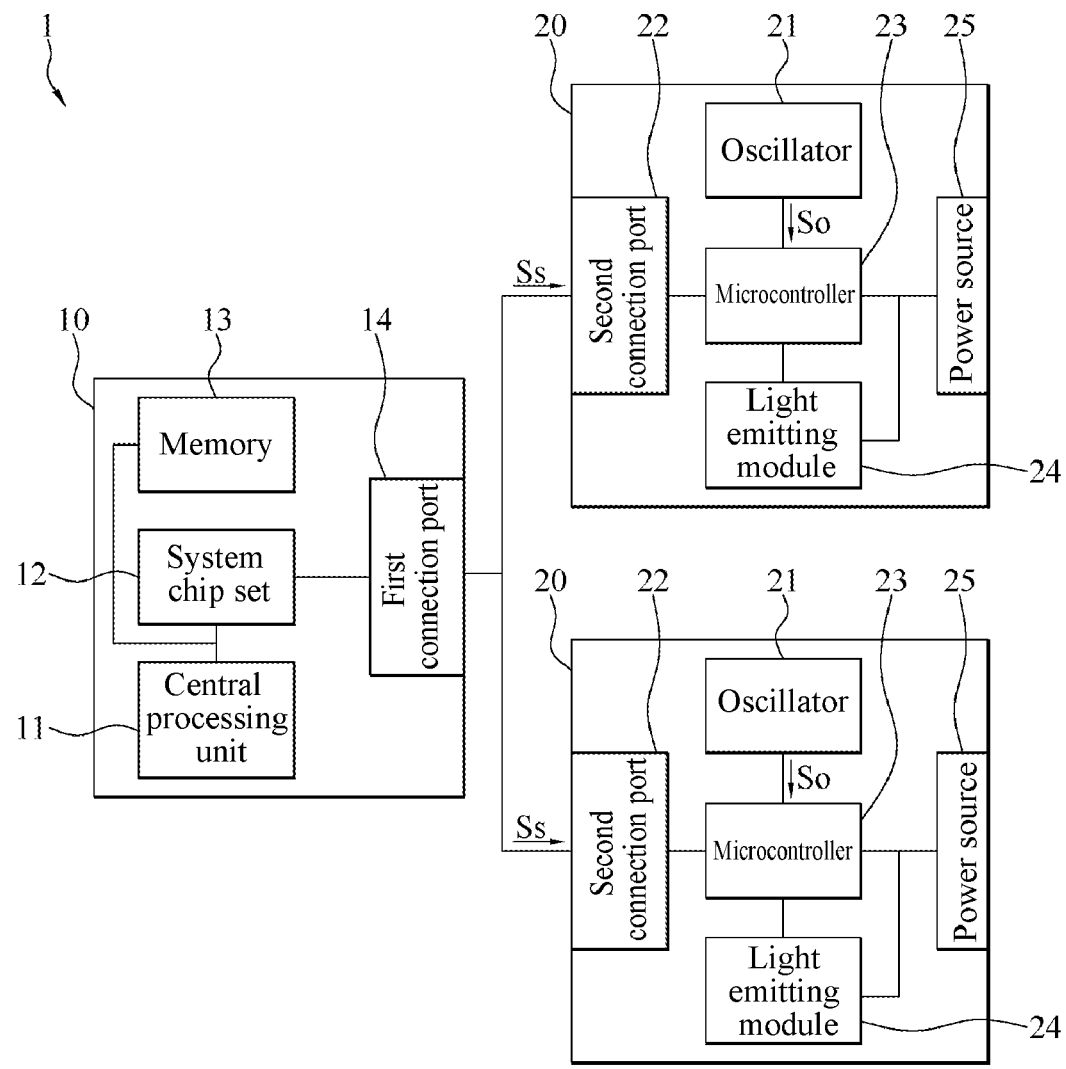
FIG. 1 is a schematic block diagram of a computer system according to a first embodiment of the instant disclosure.

FIG. 1 is a schematic block diagram of a computer system according to a first embodiment of the instant disclosure.

As shown in FIG. 1, the computer system 1 includes a main board 10 and one or more electronic devices 20 (two electronic devices 20 herein). The main board 10 includes a central processing unit 11, a system chip set 12, a memory 13, and a first connection port 14 (for example, a bus) connected to the central processing unit 11 through the system chip set 12.

Figure 2:
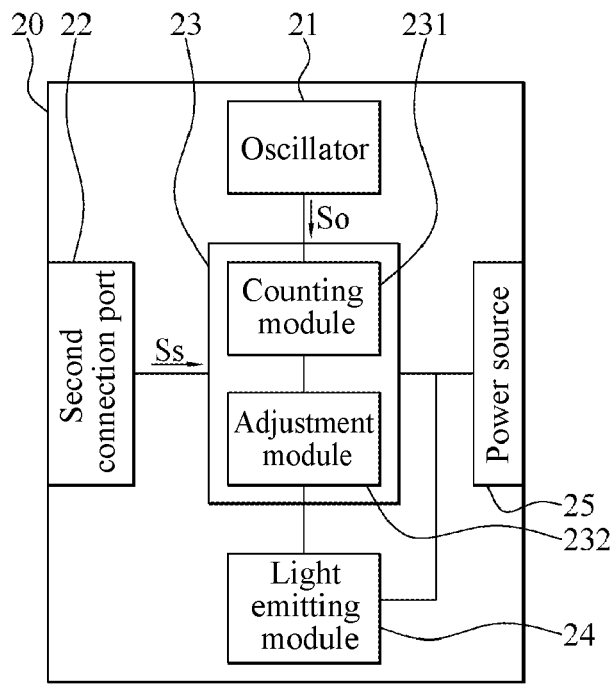
FIG. 2 is a schematic block diagram of an electronic device according to a first embodiment of the instant disclosure.

FIG. 2 is a schematic block diagram of an electronic device according to a first embodiment of the instant disclosure.

As shown in FIG. 1 and FIG. 2, each electronic device 20 includes an oscillator 21, a second connection port 22 (for example, a bus), a microcontroller 23, and a light emitting module 24. The second connection port 22 is used to connect to a first connection port 14, so that each electronic device 20 is connected to the main board 10, and the microcontroller 23 is connected to the second connection port 22 by using a signal, so as to connect to the central processing unit 11, and receive a signal sent by the central processing unit 11, for example, a correction trigger signal Ss (referring to FIG. 1) or a zeroing trigger signal Sz (not shown). Additionally, in each electronic device 20, the microcontroller 23 is connected to the oscillator 21 and the light emitting module 24. The light emitting module 24 may flicker according to a switching period, and generate a light emitting effect of a breathing light or another rhythm. The switching period may be preset in the microcontroller 23, and may be further updated by sending a new switching period by the main board 10.

Still, referring to FIG. 1 and FIG. 2, the oscillator 21 generates an oscillation signal So according to an oscillation frequency. The oscillation frequency is a fixed value at a fixed temperature, but changes as the temperature changes. The microcontroller 23 receives the oscillation signal So to calculate a time elapse. Specifically, the microcontroller 23 defines that a quantity of oscillation times of the oscillator 21 within a unit time period t is an original quantity n0 of oscillation times, so as to determine the time elapse according to the unit time period t, the original quantity n0 of oscillation times, and a quantity of oscillation times of sampling. The microcontroller 23 further sets a correspondence between a switching period and the original quantity n0 of oscillation times, and controls on or off of the light emitting module 24 according to the switching period and the time elapse.

As shown in FIG. 2, in one or some embodiments of the instant disclosure, the electronic device 20 further includes a power source 25, and the power source 25 is used to supply power required for running of the microcontroller 23 and/or the light emitting module 24. Additionally, a connection between the electronic device 20 and the main board 10 may be a structure connection and/or a signal connection. Moreover, it should be noted that, the foregoing buses include but are not limited to a system management bus (SMBus), a power management bus (PMBus) and a platform environmental control interface (PECI).

Figure 3:
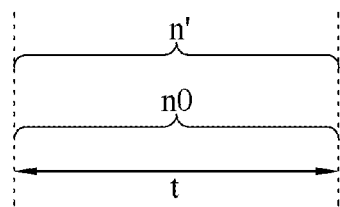
FIG. 3 is a schematic diagram of a clock signal of an electronic device according to a first embodiment of the instant disclosure.

FIG. 3 is a schematic diagram of a clock signal of an electronic device according to a first embodiment of the instant disclosure.

As shown in FIG. 2 and FIG. 3, the microcontroller 23 includes a counting module 231 and an adjustment module 232. The counting module 231 and the adjustment module 232 are built up by software module, so that these modules can be integrated as computer code segments executed by the microcontroller 23. After the counting module 231 receives the correction trigger signal Ss sent by the main board 10, the counting module 231 counts a total quantity N of oscillation times of the oscillator 21 within a preset sampling time period T, and the adjustment module 232 obtains a corrected quantity n' of oscillation times within the foregoing unit time period t according to the total quantity N of oscillation times counted within the sampling time period T, so as to reset a correspondence between the switching period and the corrected quantity n' of oscillation times, so that actual switching may conform to a true time elapse.

Moreover, for different types of electronic devices 20, because crystal types of oscillators 21 of the electronic devices 20 may be different, the oscillators 21 have different theoretical oscillation frequencies. On the other hand, because these electronic devices 20 may be disposed on different locations, these electronic devices 20 have different service temperatures, and the actual oscillation frequency is affected. Consequently, an initial original quantity n0 of oscillation times of each oscillator 21 does not conform to the true time elapse. In this case, because the electronic devices 20 are affected by the temperature, light emitting frequencies of light emitting modules 24 are asynchronous.

According to one or some embodiments of the instant disclosure, the central processing unit 11 may periodically send the correction trigger signal Ss, and provide the adjustment module 232 with the sampling time period T such as 5 seconds to reset a correspondence between the actual oscillation frequency and the true time elapse. That is, the microcontroller 23 of each electronic device 20 obtains the corrected quantity n' of oscillation times within the foregoing unit time period t, so that time calculation inside the microcontroller 23 conforms to the true time elapse. When the time calculation inside the microcontroller 23 conforms to the true time elapse, the microcontroller 23 controls on or off of a plurality of light emitting modules 24 according to the switching period, so that light emitting frequencies can be synchronized.

In addition to that the central processing unit 11 may periodically send the correction trigger signal Ss, the central processing unit 11 may determine, according to a temperature change, whether to send the correction trigger signal Ss. According to the computer system 1 described in one or some embodiments of the instant disclosure, the central processing unit 11 may obtain a service temperature value of each electronic device 20 through various buses or a basic input/output system (BIOS), and monitor whether the service temperature value is greater than a threshold. When the service temperature of the electronic device 20 increases, the oscillation frequency of the oscillator 21 also increases, so that a time period required by the oscillator 21 to reach the original quantity n0 of oscillation times is less than the unit time period t. Therefore, when the service temperature value is greater than the threshold, the central processing unit 11 may send the correction trigger signal Ss to the microcontroller 23, so that the microcontroller 23 obtains the corrected quantity n' of oscillation times to modify a mechanism of calculating a time elapse.

Figure 4:
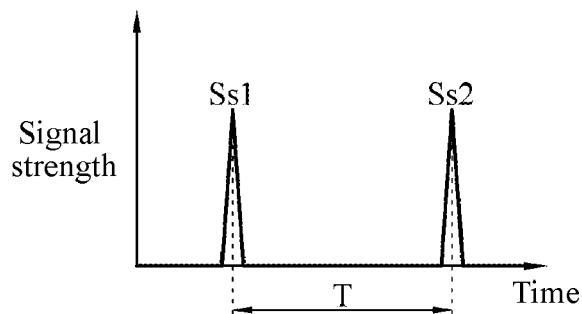
FIG. 4 is a schematic diagram of a correction trigger signal according to an embodiment of the instant disclosure.

FIG. 4 is a schematic diagram of a correction trigger signal according to an embodiment of the instant disclosure.

As shown in FIG. 4, in one or some embodiments of the instant disclosure, the correction trigger signal Ss includes a correction start signal Ss1 at the beginning of a sampling time period T and a correction end signal Ss2 at the end of the sampling time period T. The counting module 231 begins counting after receiving the correction start signal Ss1, and stops counting after receiving the correction end signal Ss2. Herein, the correction end signal Ss2 may be sent by the central processing unit 11, and the correction start signal Ss1 and the correction end signal Ss2 are each a pulse wave signal. After receiving the correction start signal Ss1, the counting module 231 begins counting a quantity of oscillation times of the oscillator 21, and after receiving the correction end signal Ss2, the counting module 231 stops counting the quantity of oscillation times of the oscillator 21. That is, a time period from when the counting module 231 receives the correction start signal Ss1 to when the counting module 231 receives the correction end signal Ss2 is the sampling time period T, and the quantity of oscillation times of the oscillator 21 counted within this time period is a total quantity N of oscillation times.

Figure 5:
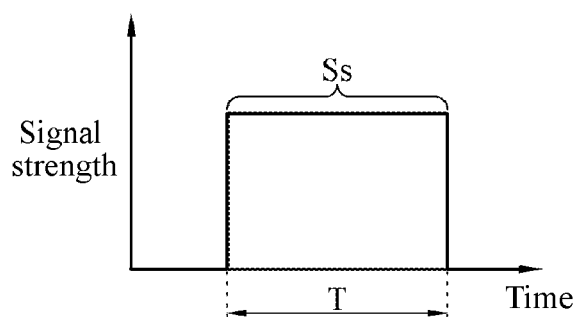
FIG. 5 is another schematic diagram of a correction trigger signal according to an embodiment of the instant disclosure.

FIG. 5 is another schematic diagram of a correction trigger signal according to an embodiment of the instant disclosure, where a form of another correction trigger signal is disclosed. As shown in FIG. 5, the correction trigger signal Ss is a continuous signal within a sampling time period, and the counting module 231 counts a total quantity N of oscillation times of the oscillator 21 when the correction trigger signal Ss exists. Specifically, in these embodiments, the correction trigger signal Ss is a continuous wave signal, and a time period for which the continuous wave signal lasts is the sampling time period T. When the correction trigger signal Ss ends, the counting module 231 also stops counting the oscillator 21.

In one or some embodiments of the instant disclosure, the counting module 231 is further used to zero, after receiving a zeroing trigger signal Sz, a time elapse. Such a step may enable all electronic devices 20 to calculate the time elapse again, so as to eliminate an error previously accumulated because of inconsistent time calculation.

In one or some embodiments of the instant disclosure, the adjustment module 232 is further used to compare a corrected quantity n' of oscillation times with an original quantity n0 of oscillation times, and reset the correspondence between the switching period and the corrected quantity n' of oscillation times when the corrected quantity n' of oscillation times is not equal to the original quantity n0 of oscillation times. That is, in this embodiment, after obtaining the corrected quantity n' of oscillation times, the adjustment module 232 does not directly reset the correspondence between the switching period and the corrected quantity n' of oscillation times, but first compares the corrected quantity n' of oscillation times with the original quantity n0 of oscillation times. Then, only when the corrected quantity n' of oscillation times is not equal to the original quantity n0 of oscillation times, the adjustment module 232 resets the correspondence between the switching period and the corrected quantity n' of oscillation times.

Figure 6:
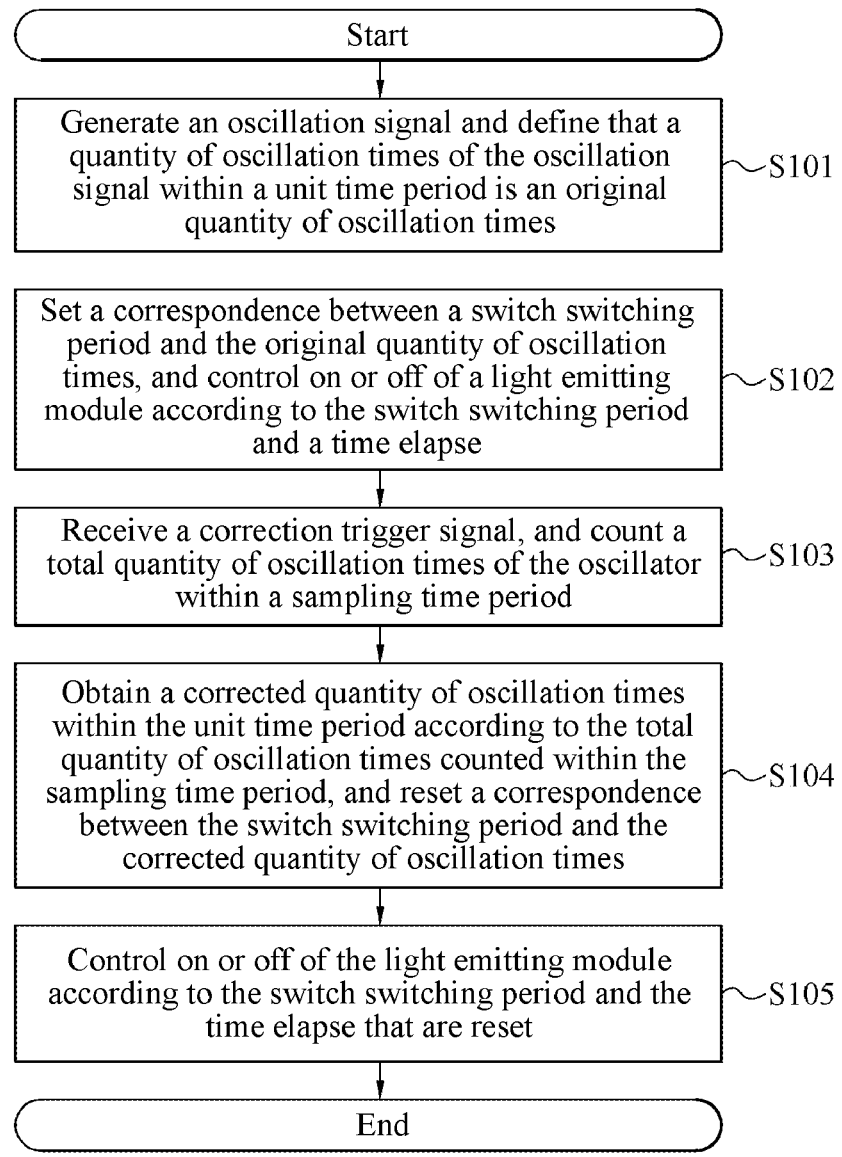
FIG. 6 is a flowchart of a method for adjusting light emitting frequency of an electronic device according to a second embodiment of the instant disclosure.

FIG. 6 is a flowchart of a method for adjusting light emitting frequency of an electronic device according to a second embodiment of the instant disclosure. As shown in FIG. 6, one or some embodiments of the instant disclosure further disclose a method for adjusting light emitting frequency of an electronic device. Steps of the method are described as follows:

First, a microcontroller 23 receives an oscillation signal So generated by an oscillator 21 to calculate a time elapse and defines that a quantity of oscillation times of the oscillation signal So within a unit time period t is an original quantity n0 of oscillation times, as shown in step S101.

Then, the microcontroller 23 sets a correspondence between a switching period and the original quantity n0 of oscillation times, and controls on or off of a light emitting module 24 according to the switching period and a time elapse, as shown in step S102.

Then, a counting module 231 of the microcontroller 23 receives a correction trigger signal Ss, and counts a total quantity N of oscillation times of the oscillator 21 within a sampling time period T, as shown in step S103.

Subsequently, an adjustment module 232 of the microcontroller 23 obtains a corrected quantity n' of oscillation times within the unit time period T according to the total quantity N of oscillation times counted by the counting module 231 within the sampling time period T, and resets a correspondence between the switching period and the corrected quantity n' of oscillation times, as shown in step S104.

Then, the microcontroller 23 controls on or off of the light emitting module 24 according to the switching period and the time elapse that are reset, as shown in step S105.

In one or some embodiments of the instant disclosure, in the step of receiving a correction trigger signal Ss, the correction trigger signal Ss includes a correction start signal Ss1 at the beginning of the sampling time period T and a correction end signal Ss2 at the end of the sampling time period T, and the step further includes that: the counting module 231 starts to count after receiving the correction start signal Ss1, and stops counting after receiving the correction end signal Ss2.

In one or some embodiments of the instant disclosure, the correction trigger signal Ss is a continuous signal within the sampling time period T, and the step further includes that the counting module 231 counts the total quantity N of oscillation times of the oscillator 21 when the correction trigger signal Ss exists.

In one or some embodiments of the instant disclosure, the method further includes a step of zeroing, after receiving a zeroing trigger signal Sz by using the counting module 231, a time elapse. This step may be performed between any steps or together with any one step in the flowchart shown in FIG. 6. In an embodiment, the microcontroller 23 may first receive the zeroing trigger signal Sz to zero, and then the microcontroller 23 receives the correction trigger signal Ss to perform the foregoing procedure of correcting the quantity of oscillation times.

Figure 7:
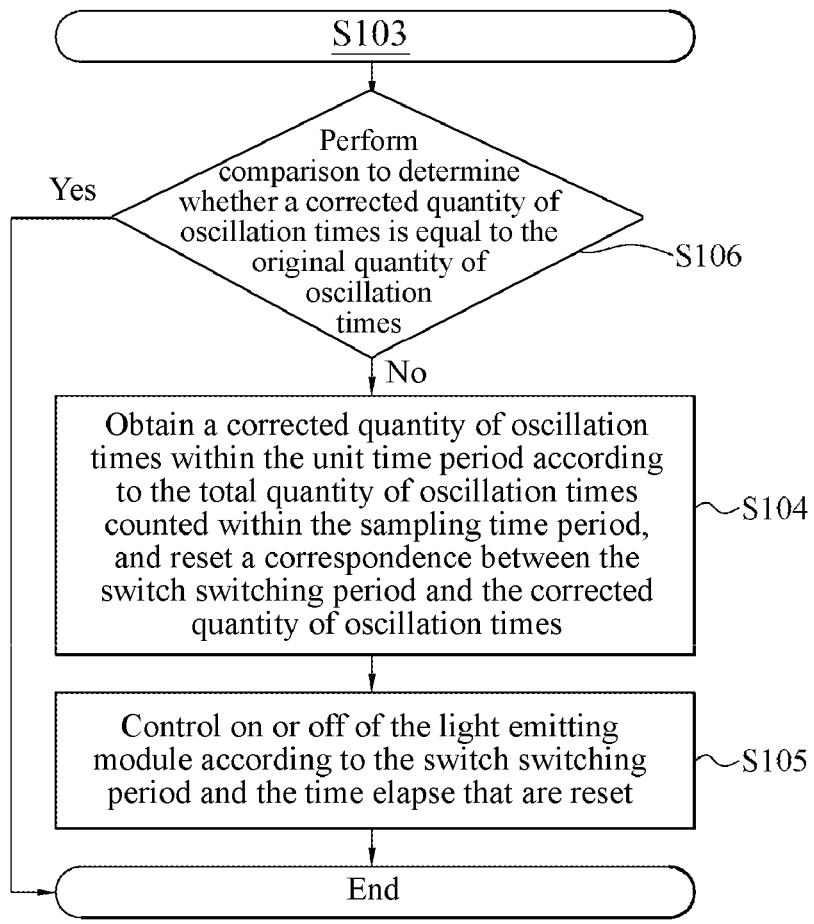
FIG. 7 is a flowchart of a method for adjusting light emitting frequency of an electronic device according to a third embodiment of the instant disclosure.
Figure 8:
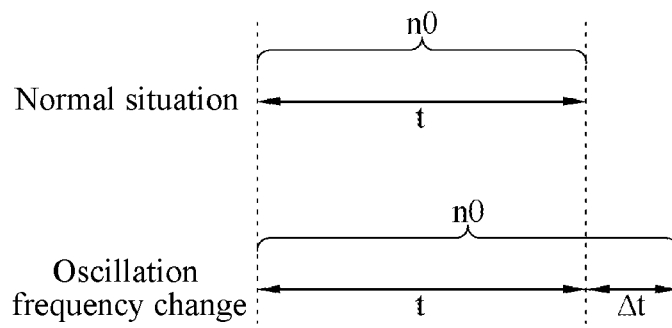
FIG. 8 is a schematic diagram of a clock signal of an electronic device known to the inventor for which a light emitting element is configured.

FIG. 7 is a flowchart of a method for adjusting light emitting frequency of an electronic device according to a third embodiment of the instant disclosure. In one or some embodiments of the instant disclosure, after step S103, the method further includes that the adjustment module 232 compares to determine whether a corrected quantity n' of oscillation times is equal to the original quantity n0 of oscillation times, as shown in step S106. When the corrected quantity n' of oscillation times is not equal to the original quantity n0 of oscillation times, the adjustment module 232 resets a correspondence between the switching period and the corrected quantity n' of oscillation times. If the corrected quantity n' of oscillation times is equal to the original quantity n0 of oscillation times, the microcontroller 23 terminates this method. As described above, in this embodiment, after obtaining the corrected quantity n' of oscillation times, the adjustment module 232 does not directly reset the correspondence between the switching period and the corrected quantity n' of oscillation times, but first compares the corrected quantity n' of oscillation times with the original quantity n0 of oscillation times. Then, only when the corrected quantity n' of oscillation times is not equal to the original quantity n0 of oscillation times, the adjustment module 232 resets the correspondence between the switching period and the corrected quantity n' of oscillation times.

Through the electronic device capable of adjusting light emitting frequency, the computer system, and the method described in one or some embodiments disclosed above, the microcontroller of the electronic device may perform procedures of counting a quantity of oscillation times and adjusting a switching period. Therefore, the microcontroller of the electronic device may control on or off of the light emitting module according to a switching period and a time elapse that are reset, so that light emitting frequencies of light emitting modules of a plurality of electronic devices are synchronized.

What is claimed is:

1. A computer system, comprising:
    a main board, comprising at least: a central processing unit, a system chip set and a first connection port connected to the central processing unit through the system chip set
    a plurality of electronic devices, respectively connected to the main board through the first connection port; wherein each of the plurality of electronic devices comprises:
        an oscillator, used to generate an oscillation signal;
        a second connection port, connected to the first connection port;
        a microcontroller, connected to the oscillator and connected to the central processing unit of the main board through the second connection port and the first connection port, wherein the microcontroller is used to receive the oscillation signal to calculate a time elapse, define that a quantity of oscillation times of the oscillator within a unit time period is an original quantity of oscillation times, and set a correspondence between a switching period and the original quantity of oscillation times; and
        a light emitting module, connected to the microcontroller, wherein the microcontroller is configured to control on or off of the light emitting module according to the switching period and the time elapse, wherein the microcontroller further comprises:
        a counting module, used to count, after the microcontroller receives a correction trigger signal through the second connection port and the first connection port, a total quantity of oscillation times of the oscillator according to the oscillation signal; and
        an adjustment module, used to obtain a corrected quantity of oscillation times within the unit time period according to the total quantity of oscillation times counted by the counting module within a sampling time period, and reset a correspondence between the switching period and the corrected quantity of oscillation times;
    wherein, the central processing unit sends the correction trigger signal through the first connection port to the plurality of electronic devices, and the correction trigger signal is a continuous signal within the sampling time period to tag a beginning of the sampling time period and an end of the sampling time period.

2. The computer system according to claim 1, wherein the central processing unit obtains a service temperature value of the electronic device, and sends the correction trigger signal when the service temperature value is greater than a threshold.

3. The computer system according to claim 1, wherein the central processing unit sends a zeroing trigger signal through the first connection port, and after receiving the zeroing trigger signal, the microcontroller zeros the time elapse.

4. The computer system according to claim 1, wherein the counting module counts the total quantity of oscillation times of the oscillator when the correction trigger signal exists.

5. The computer system according to claim 1, wherein the microcontroller is used to zero, after receiving a zeroing trigger signal, the time elapse.

6. The computer system according to claim 1, wherein the adjustment module is used to compare the corrected quantity of oscillation times with the original quantity of oscillation times, and reset the correspondence between the switching period and the corrected quantity of oscillation times when the corrected quantity of oscillation times is not equal to the original quantity of oscillation times.

* * * * *